United States Patent [19]

Sinsky

[11] 3,830,091

[45] Aug. 20, 1974

[54] ACCELEROMETER COMPARATOR

[75] Inventor: Joel A. Sinsky, Silver Spring, Md.

[73] Assignee: The United States of America as represented by the Secretary of the Navy, Washington, D.C.

[22] Filed: Apr. 5, 1973

[21] Appl. No.: 348,344

[52] U.S. Cl. .................................. 73/1 D, 73/1 DV
[51] Int. Cl. .......................................... G01p 21/00
[58] Field of Search.................... 73/1 DV, 1 D, 71.6

[56] References Cited
UNITED STATES PATENTS
2,873,426  2/1959  Dranetz............................. 73/1 DV

OTHER PUBLICATIONS

"High-Frequency Strain Gauge and Accelerometer Calibration," Nisbet et al., The Journal of the Acoustical Society of America, Vol. 32, No. 1, pp. 71-75, Jan. 1960.

"Piezoelectric Shakers for Wide Frequency Calibration of Vibration Pickups," Jones et al., The Journal of the Acoustical Soc. of America, pp. 1556-1559, June 1969.

"Comparison Calibration Techniques for Vibration Transducers," Chernoff, Instrument Society of America Conference Sept. 1967.

Primary Examiner—James J. Gill
Attorney, Agent, or Firm—R. S. Sciascia; Arthur L. Branning

[57] ABSTRACT

An accelerometer test system using an aluminum rod as a shaker or vibrator for comparing the performance of a test accelerometer with a standard accelerometer. The rod is driven by piezoelectric crystals affixed to its sides. The outputs of both accelerometers at ten different frequencies are amplified, filtered and displayed on a digital voltmeter and on an oscilloscope.

4 Claims, 1 Drawing Figure

A HIGH FREQUENCY ACCELEROMETER COMPARATOR.

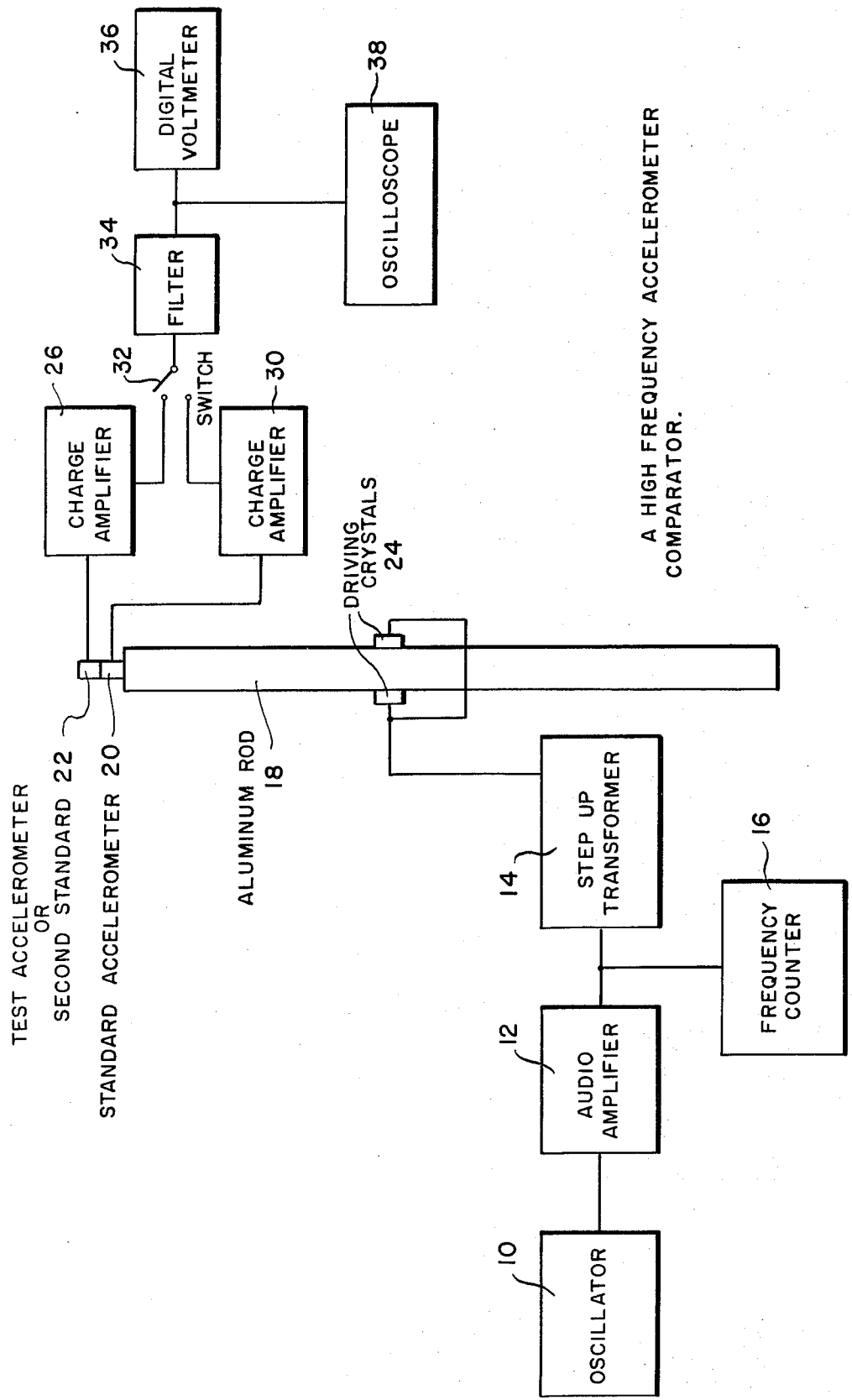

3,830,091

ACCELEROMETER COMPARATOR

BACKGROUND OF THE INVENTION

This invention relates generally to acoustics and more specifically to accelerometers used in monitoring the motion of acoustic sources.

In the design of high powered acoustic sources it is necessary to measure the velocity distribution of the source transducer. Microminiature accelerometers are frequently used to monitor the velocity of source scale models. Calibration of these accelerometers must be continuously checked since they are in constant use on many different transducer models under widely varying conditions of amplitude and frequency and must be applied and removed frequently from the source scale models in both water and air environments.

Vibration test systems used for accelerometer calibrations which satisfy the dynamic frequency range and acceleration amplitude requirements corresponding to model source transducer operational parameters are commercially available but are very expensive. These systems are designed to check the entire calibration curve of the accelerometer over a continuous spectrum of operating frequencies rather than at just a few distinct frequencies which would be sufficient.

SUMMARY OF THE INVENTION

It is therefore the object of the present invention to provide an inexpensive accelerometer comparator which can check the calibration of an accelerometer at a number of specified frequencies at acceleration amplitudes up to 300 g.

Other objects, advantages and novel features of the invention will become apparent from the following detailed description of the invention when considered in conjunction with the accompanying drawing.

Briefly, the above objects are attained according to the present invention by providing a vibrating rod having an unloaded fundamental longitudinal resonance frequency of 1,000 Hz. The rod is excited at roughly integer multiples of the fundamental frequency with both a reference accelerometer and a test accelerometer mounted on the rod. The outputs of the accelerometers are then compared through the use of electronic equipment to determine if their readings match, thereby indicating calibration of the test accelerometer.

BRIEF DESCRIPTION OF THE DRAWING

The FIGURE shows an embodiment of the present invention in schematic form.

DETAILED DESCRIPTION

A block diagram of the comparator system is shown in the FIGURE. The high frequency mechanical motion necessary for operation of the comparator is generated in a shaker portion consisting of a 100.5 inch long aluminum rod 18 having a 2 inch square cross section. The length of the rod 18 is selected such that its unloaded fundamental longitudinal resonance is 1,000 Hz. Driving crystals 24 consist of PZT ceramic piezoelectric discs which are bonded at symmetric locations on opposite sides of the rod 18. Large alternating voltages are applied to the driving crystals 24 via oscillator 10, audio amplifier 12, and step-up transformer 14, at harmonics of the natural resonance frequency of the bar which can be monitored by frequency counter 16. This results in a relatively large displacement and hence acceleration of the end faces of the rod 18 directed along its axis. The amplitude of the end face acceleration at any one of the harmonic frequencies increases in proportion to the Q value of the rod at that harmonic. The Q value of the rod is defined at $2\pi$ times the mean stored energy divided by the work done per cycle. A typical Q value for a material such as 6061-T6 aluminum is five thousand which means that the energy stored per cycle is $10^4\pi$ times the energy dissipated per cycle to maintain the oscillations of the shaker rod. In addition, the symmetry of drive by the driving crystals 24 ensures that the flexure or bending modes of the rod will not be excited. The faces of the rod 18, which serve as the shaker heads, oscillate parallel to the rod's axis without rocking or plate model breakup. Tests made by mounting an accelerometer perpendicular to the axis of the rod measured no motion thereby verifying the absence of detectable flexure or bending of the rod 18. Consequently, accelerometers mounted on the rod's shaker head with their axes of sensitivity parallel to the axis of the rod 18 will sense the longitudinal acceleration of the end of the rod and will not sense any centrifugal acceleration due to rocking or bending of the rod 18.

A standard accelerometer 20 (such as Kistler Model 808K) is mounted on the shaker head of the rod 18 and used as a reference to monitor the head acceleration. A test accelerometer 22, the calibration of which is to be checked, is mounted atop the standard accelerometer 18 such that its axis of sensitivity coincides with that of the standard's. The output of the test accelerometer 22 can then be compared to that of the standard through the use of the test equipment shown in the FIGURE.

Charge amplifiers 26 and 30 amplify the output signal of the test accelerometer or second standard 22 (another experiment explained more fully below) and the standard accelerometer 20, respectively. Filter 34 can be selectively connected to the output of either charge amplifier via switch 32. The output of filter 34 is connected to both a digital voltmeter 36 and an oscilloscope 38 for analysis. The calibration of an accelerometer by using this system is, therefore, a comparison calibration, referenced to the known calibration of the standard accelerometer. The Kistler standard calibration is maintained current by periodic recertification at the Navy Standards Laboratory.

To check the rod's performance in meeting the previously mentioned requirements of pure longitudinal translation over the frequency range of interest, a second Kistler standard with a known calibration can be mounted atop the first standard and their outputs compared. In tests made at the Naval Research Laboratory the ratio of the accelerometer outputs at 10g for each of the calibration frequencies was 1.00 ±0.01. This result is in agreement with the individual factory calibration curves obtained with each standard. The dynamic amplitude range of the existing comparator system is approximately 1g to 300g over the frequency range of interest.

The calibration factor of an accelerometer is nearly constant over the manufacturer's recommended frequency range of use, and significant deviations from the original factory calibration factor indicate a defect in the accelerometer. If the comparator measurements determine that the test accelerometer is defective, the accelerometer can be returned to the manufacturer for repair and recalibration. Thus through the use of an aluminum rod, which can be vibrated by an audio power source through piezoelectric discs 24 at a number of harmonic frequencies of the rod 18, a test accelerometer 22 can be compared with a standard accelerometer 20 to thereby determine in an inexpensive, quick and accurate manner if it is correctly calibrated at those harmonic frequencies.

An alternative method for calibration is to optically monitor the end face of the rod 18, thereby making the rod 18 an absolute standard as well as a shaker. This eliminates the need for a comparison calibration procedure based on a secondary standard such as the Kistler.

Obviously many modifications and variations of the present invention are possible in light of the above teachings. It is therefore to be understood that within the scope of the appended claims the invention may be practiced otherwise than as specifically described.

What is claimed and desired to be secured by Letters patent of the United States is:

1. A device for comparing a test accelerometer with a standard accelerometer comprising:

vertical aluminum rod means on the end of which is mounted said test accelerometer and said standard accelerometer;

at least one driving crystal connected to the opposite sides of the middle of said aluminum rod means to cause it to vibrate longitudinally at a number of harmonic frequencies;

generating means for supplying a high amplitude alternating voltage to said driving crystals; and, detecting means for comparing the output of said test accelerometer and said standard accelerometer.

2. The device of claim 1 wherein said aluminum rod means comprises a rod having a length of approximately 100.5 inches and a cross-sectional area of approximately 2 square inches.

3. The device of claim 2 wherein said generating means comprises:

an oscillator for producing an alternating output signal;

an amplifier connected to said oscillator; and, a step-up transformer connected to said amplifier.

4. The device of claim 3 wherein said detecting means comprises a voltmeter and an oscilloscope connected in parallel.

* * * * *